SOLOMON BEYL, OF OSBORN, OHIO.

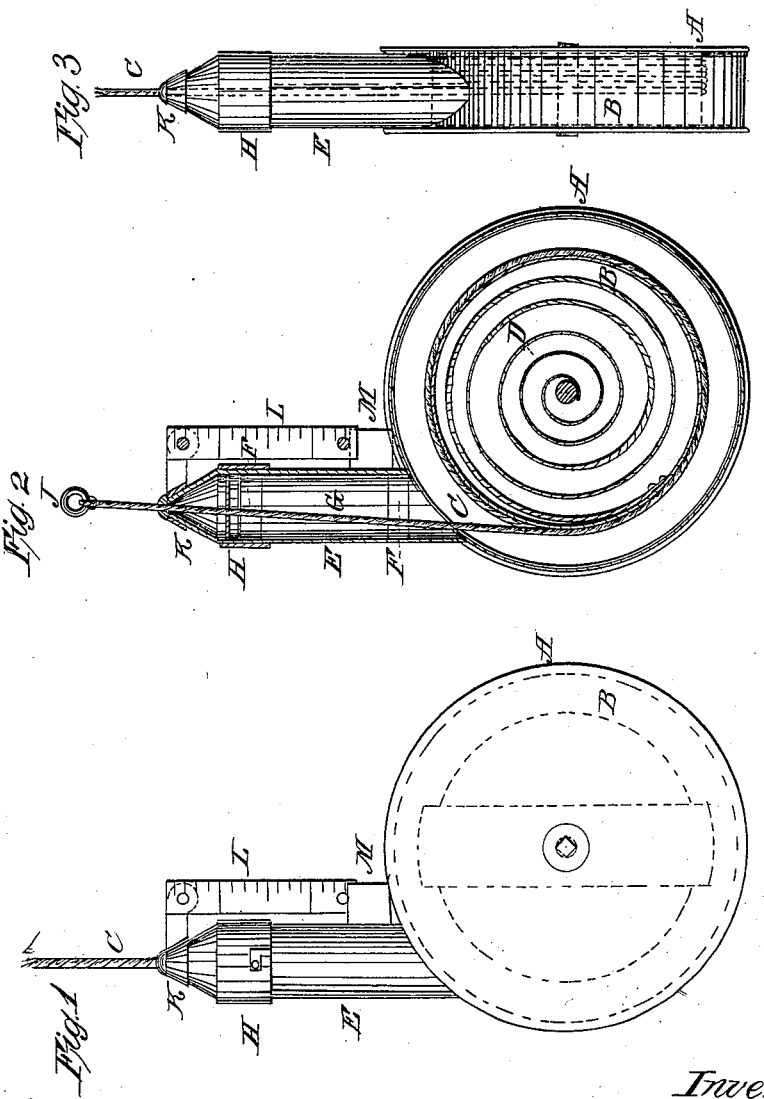

Letters Patent No. 85,202, dated December 22, 1868.

IMPROVEMENT IN CHALK-LINE BOX.

The Schedule referred to in these Letters Patent and making part of the same.

*To all whom it may concern:*

Be it known that I, SOLOMON BEYL, of Osborn, Greene county, Ohio, have invented an Improved "Measuring and Spring Chalk-Line;" and I hereby declare the following to be an exact description thereof, reference being had to the accompanying drawings, and to the letters of reference marked thereon, making a part of this specification, in which—

Figure 1 represents a side view of the box and tube with rule attached.

Figure 2, a sectional view of the same, showing the mode of chalking the line as it is drawn from the drum through the upright tube.

Figure 3 is an end view of the same.

The nature of my invention consists in the arrangement and construction of a measuring and spring chalk-line, the chalk-line being wound upon a drum that is operated by a coiled spring, and encased in a cylindrical box. To one side of the box I attach an upright tube, into each end of which I insert small boxes containing sponge or other elastic material, and the space between the sponge-boxes, I fill with pulverized chalk.

When necessary to be used, the line is drawn from the box by means of the ring at the top of the tube, to which it is attached, and passes through the pulverized chalk and sponge-boxes, and becoming thoroughly coated with chalk during its passage, thereby greatly facilitating the work of the mechanic.

The line, after being used, is readily carried back to its place in the box by means of the coiled spring.

The object of the sponge-boxes is to prevent an excess of chalk from being carried out with the line, or back into the box.

To the upper end of the tube is attached a rule that folds down against the side of the tube, and is held securely in its place by projecting jaws in the lower part of the tube.

A represents the cylindrical case or box that contains the drum B, upon which the line C is wound and operated by the coiled spring D.

E is the upright tube, containing the sponge-boxes F F and chalk-receptacle G, through which the line C passes.

H is the movable cap of the tube E.

J, the ring to which the outer end of the line is attached.

K is a conical swivel upon the top of the cap H, and to which is attached an ordinary jointed rule, L, which, when not in use, is folded down against the side of the tube E, and held securely in its place by the projecting jaws M.

The rule L is for the purpose of measuring the chalk-line as it is drawn out of the box, or can be used in measuring any piece of work when the line is not required to be used.

What I claim as my invention, and desire to secure by Letters Patent, is—

The arrangement of the sponge and cases F F, chalk-receptacle G, measuring-rule L, and spring chalk-line C, as herein described, and for the purposes set forth.

SOLOMON BEYL.

Witnesses:
    EDWIN PARKER,
    J. F. PERRINE.